Oct. 4, 1949.   C. J. FASHING   2,483,631
SMALL GAME SUSPENDING DEVICE
Filed Oct. 12, 1945

INVENTOR
CHARLES JULIUS FASHING
ATTORNEYS

Patented Oct. 4, 1949

2,483,631

UNITED STATES PATENT OFFICE 2,483,631

SMALL GAME SUSPENDING DEVICE

Charles J. Fashing, Lorain, Ohio

Application October 12, 1945, Serial No. 621,874

1 Claim. (Cl. 294—80)

My invention relates to devices for suspending small game by its hind legs for the purpose of removing its pelt.

It is ordinary use to tie, wire or nail small game, such as rabbits, muskrats, squirrels, minks etc. by their hind legs during the process of skinning them.

The object of my invention is to eliminate this tiresome procedure and to provide a hanger to hold such small game by its hind legs in clamping jaws and which can be cheaply made and is easy to operate.

Another object of my invention is to provide a hanger which works on the principle of leverage, so that the holding pressure of the clamping jaws will increase with the weight of the animal to be operated on.

A further object of the invention is to provide a hanger which can be used for several different purposes, for instance for hanging fowl for display in stores, or for holding them while removing the feathers after scalding.

Other objects of my invention may appear in the following description which will be understood best by referring to the accompanying drawings, which form a part thereof.

My invention resides in the novel construction and combination of parts described in the specification and shown in the drawings. It is however to be understood that my invention is not to be restricted to the exact construction and combination shown and described, but that such changes and modifications may be made which fall within the scope of the claim appended hereto.

In the drawings

Figure 1:
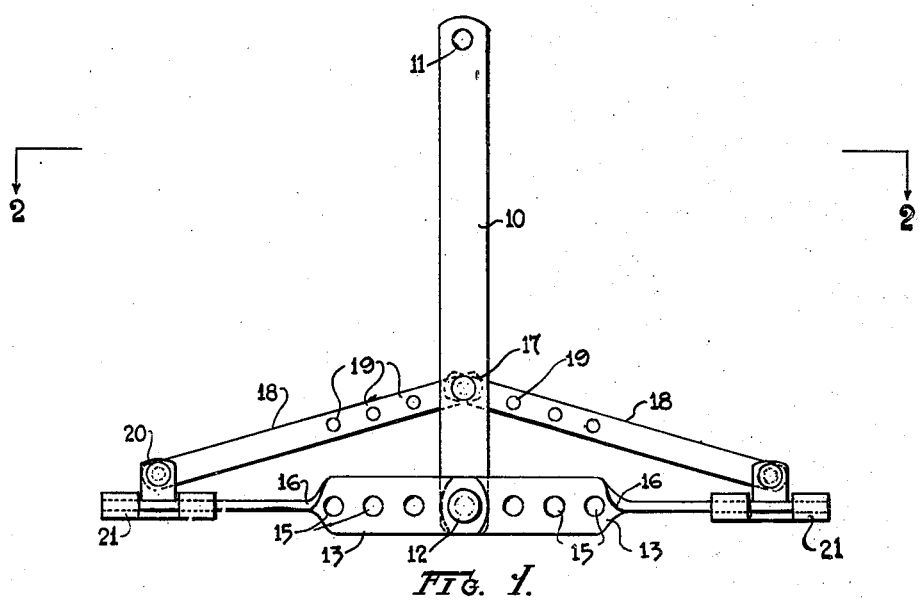
Fig. 1 is a front elevational view of the hanger according to my invention.

The hanger according to my invention has a flat hanger bar 10 which serves the purpose of supporting all the other parts of the hanger and also any animal or fowl held in the hanger. The bar 10 has a hole 11 at its upper end for receiving a hook or other supporting means (not shown). At its lower end a bolt or rivet 12 extends through a hole in said hanger bar 10 and pivotally supports a pair of jaw bars 13. These jaw bars are made from flat steel bars. Adjacent one of the ends of each bar a U-shaped recess 14 is cut into the front edge of the bar, and a plurality of holes 15 is provided adjacent the other end and spaced from each other lengthwise of the bar 13. These holes are big enough to permit free entrance of bolt or rivet 12 and while this bolt or rivet is secured against falling out of position it is loose enough in the holes 15 to permit pivotal movement of the jaw bars 13. After the holes 15 and the recess 14 are provided in said bars each bar is twisted at right angles to itself, between the recess and the hole next thereto, as plainly indicated at 16 in Figs. 1 and 2. The holes 15 in the jaw bars permit adjustment of the distance between the clamping recesses 14.

Another bolt or rivet 17 extends through the hanger bar 10 at a distance above the first mentioned bolt 12, and pivotally supports lever arms 18 adjacent one end of each arm. A plurality of holes 19 is provided in these arms serving the same purpose as the holes 15 in the jaw bars, and these holes are big enough to permit free swinging movement of the lever arms 18 about bolt 17. At the free ends of arms 18 bolts 20 extend through said arms and are pivotally connected with sliding jaw sleeves 21.

Figure 3:
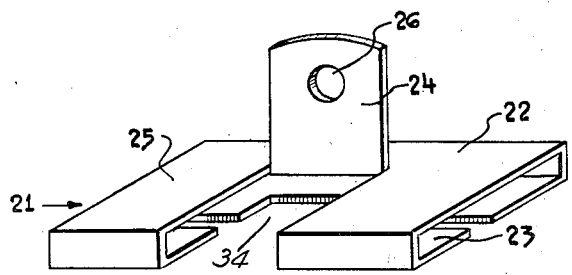
Fig. 3 is a perspective view of a detail illustrating the sliding sleeve portion of the clamping jaws.

These sleeves are preferably made from strap iron, bent into shape as illustrated in Fig. 3. Each jaw sleeve has a body 22 bent at right angles to form the sleeve, which is adapted to slide freely on the jaw end of the jaw bars 13. The center portion of the lower part 23 of the sleeve is cut out similar to the recesses in the jaw bars, and the portion 24 of the upper part 25 of the sleeve located directly above the cutout 34 in the lower part 23 is bent upwardly at right angles and is provided with a hole 26 to permit free entrance of bolt 20.

Figure 2:
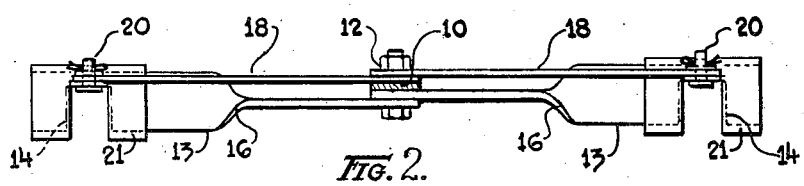
Fig. 2 is a sectional horizontal view taken on line 2—2 of Fig. 1.

In assembling the hanger of my invention it is necessary to see that the recesses 14 in the jaw bars 13 and the ones in the sleeves 21 will be so arranged that they will coincide with each other when the jaw bars extend at right angles to the hanger bar 10 as shown in Fig. 1. That means that the jaws are wide open and that it will be easy to insert the hind legs of the animal to be skinned into said jaws. By letting the jaw bars 13 and the lever arms 18 swing downwardly the sleeves will be moved inwardly on said jaw bars, thereby closing each jaw and clamping onto the leg inserted therein. The heavier the load on the hanger is, the stronger the clamping force exerted on the legs in the jaws will be.

From the above description it will be understood, that a hanger according to my invention can be easily and cheaply made and will be a great convenience to all who have to handle small game animals and the like.

Having described my invention, what I claim and desire to secure by Letters Patent is:

In a game hanger, a hanger adapted to be supported by a hook, a pair of jaw bars pivotally fastened to said hanger bar and extending in opposite directions therefrom, each of said jaw bars having a clamping recess cut therein, a pair of sleeves adapted to slide freely on said jaw bars, said sleeves having clamping recesses cut therein corresponding to those in the jaw bars, and a pair of lever arms pivotally mounted to a point on the hanger at a distance above the jaw bars, the free ends of the lever arms being pivotally connected with said sleeves.

CHARLES J. FASHING.

REFERENCES CITED

The following references are of record in the file of this patent:

UNITED STATES PATENTS

| Number | Name | Date |
| --- | --- | --- |
| 1,087,159 | Cooper | Feb. 17, 1914 |
| 1,695,138 | Brainard | Dec. 11, 1928 |

FOREIGN PATENTS

| Number | Country | Date |
| --- | --- | --- |
| 22,186 | Denmark | June 11, 1917 |